(12) United States Patent
Kim et al.

(10) Patent No.: US 7,944,374 B1
(45) Date of Patent: May 17, 2011

(54) PSEUDO-ORTHOGONAL CODE GENERATOR

(75) Inventors: Yongseong Kim, Goyang-si (KR); Kyeunghak Seo, Seoul (KR); Jinwoong Cho, Yongin-si (KR); Hyunseok Lee, Goyang-si (KR); Taigil Kwon, Goyang-si (KR); Yongseok Lim, Seoul (KR)

(73) Assignee: Korea Electronics Technology Institute, Seongham (KR)

( * ) Notice: Subject to any disclaimer, the term of this patent is extended or adjusted under 35 U.S.C. 154(b) by 0 days.

(21) Appl. No.: 12/646,993

(22) Filed: Dec. 24, 2009

(30) Foreign Application Priority Data

Nov. 9, 2009 (KR) .................. 10-2009-0107639

(51) Int. Cl.
*H03M 7/00* (2006.01)

(52) U.S. Cl. ........... 341/50; 714/760; 714/793; 714/795
(58) Field of Classification Search .................... 341/50; 714/760, 793, 795
See application file for complete search history.

(56) References Cited

U.S. PATENT DOCUMENTS

| | | | |
|---|---|---|---|
| 5,193,094 A * | 3/1993 | Viterbi | 714/795 |
| 6,167,552 A * | 12/2000 | Gagnon et al. | 714/793 |
| 6,496,474 B1 * | 12/2002 | Nagatani et al. | 370/208 |
| 7,031,369 B2 * | 4/2006 | Kurabe et al. | 375/140 |

* cited by examiner

*Primary Examiner* — Khai M Nguyen

(57) ABSTRACT

A pseudo-orthogonal code generator is provided. The pseudo-orthogonal code generator simplifies overall configuration and provides a more efficient operating speed by implementing a pseudo-orthogonal code generator using combined circuits instead of using a read only memory (ROM) circuit. The pseudo-orthogonal code generator reduces its overall size by reducing gate area.

4 Claims, 4 Drawing Sheets

PSEUDO-ORTHOGONAL CODE GENERATOR

CROSS-REFERENCE TO RELATED APPLICATIONS

This application claims the benefit under 35 U.S.C. §119(a) of a Korean Patent Application No. 10-2009-0107639 filed Nov. 9, 2009 in the Korean Intellectual Property Office, the entire disclosure of which is incorporated herein by reference for all purposes.

BACKGROUND

1. Field

This following description relates to a pseudo-orthogonal code generator, and more particularly, to a pseudo-orthogonal code generator that minimizes the complexity of a pseudo-orthogonal code generator and improves the operating speed in a radio transmitting system using pseudo-orthogonal codes.

2. Description of the Related Art

Table 1 is a Walsh-Hardamard code table that is used in a conventional orthogonal coding method. For example, in a conventional orthogonal code generator receiving four binary signal inputs, the total number of orthogonal codes that a bit row can have from these inputs are $16(=2^4)$. In this example, the length of each orthogonal code is always 16 bits as shown in Table 1, and each column of the orthogonal codes are orthogonal to each other.

TABLE 1

WALSH-HARDAMARD CODE TABLE

| Walsh No. | Walsh code | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 1 | 0 | 1 | 0 | 1 | 0 | 1 | 0 | 1 |
| 2 | 0 | 0 | 1 | 1 | 0 | 0 | 1 | 1 | 0 | 0 | 1 | 1 | 0 | 0 | 1 | 1 |
| 3 | 0 | 1 | 1 | 0 | 0 | 1 | 1 | 0 | 0 | 1 | 1 | 0 | 0 | 1 | 1 | 0 |
| 4 | 0 | 0 | 0 | 0 | 1 | 1 | 1 | 1 | 0 | 0 | 0 | 0 | 1 | 1 | 1 | 1 |
| 5 | 0 | 1 | 0 | 1 | 1 | 0 | 1 | 0 | 0 | 1 | 0 | 1 | 1 | 0 | 1 | 0 |
| 6 | 0 | 0 | 1 | 1 | 1 | 1 | 0 | 0 | 0 | 0 | 1 | 1 | 1 | 1 | 0 | 0 |
| 7 | 0 | 1 | 1 | 0 | 1 | 0 | 0 | 1 | 0 | 1 | 1 | 0 | 1 | 0 | 0 | 1 |
| 8 | 0 | 0 | 0 | 0 | 0 | 0 | 0 | 0 | 1 | 1 | 1 | 1 | 1 | 1 | 1 | 1 |
| 9 | 0 | 1 | 0 | 1 | 0 | 1 | 0 | 1 | 1 | 0 | 1 | 0 | 1 | 0 | 1 | 0 |
| 10 | 0 | 0 | 1 | 1 | 0 | 0 | 1 | 1 | 1 | 1 | 0 | 0 | 1 | 1 | 0 | 0 |
| 11 | 0 | 1 | 1 | 0 | 0 | 1 | 1 | 0 | 1 | 0 | 0 | 1 | 1 | 0 | 0 | 1 |
| 12 | 0 | 0 | 0 | 0 | 1 | 1 | 1 | 1 | 1 | 1 | 1 | 1 | 0 | 0 | 0 | 0 |
| 13 | 0 | 1 | 0 | 1 | 1 | 0 | 1 | 0 | 1 | 0 | 1 | 0 | 0 | 1 | 0 | 1 |
| 14 | 0 | 0 | 1 | 1 | 1 | 1 | 0 | 0 | 1 | 1 | 0 | 0 | 0 | 0 | 1 | 1 |
| 15 | 0 | 1 | 1 | 0 | 1 | 0 | 0 | 1 | 1 | 0 | 0 | 1 | 0 | 1 | 1 | 0 |

As described above, a conventional orthogonal code generator requires 16 code bits for transmission of total 4 bits. Thus, the efficiency of the transmission channel is deteriorated due to an extremely low spectral efficiency of no more than 0.25(4/16).

Korean Patent No. 0761669, issued on Sep. 19, 2007, describes a pseudo-orthogonal code generator having better spectral efficiency than a conventional orthogonal code generator.

In the pseudo-orthogonal code generator described in Korean Patent No. 0761669, the contents of the pseudo-orthogonal code memory, for example, the relationship between the input address and the output code, may be expressed by Equation 1.

$$C(i) = 0.5 \times \begin{cases} (-1)^{b_2 \oplus (i_1 \wedge b_1) \oplus (i_0 \wedge b_0)} \\ +(-1)^{b_5 \oplus i_2 \oplus (i_1 \wedge b_4) \oplus (i_0 \wedge b_3)} \\ +(-1)^{b_8 \oplus i_3 \oplus (i_1 \wedge b_7) \oplus (i_0 \wedge b_6)} \\ +(-1)^{\overline{b_2 \oplus b_5 \oplus b_8} \oplus i_3 \oplus i_2 \oplus (i_2 \wedge (b_1 \oplus b_4 \oplus b_7)) \oplus (i_0 \wedge (b_0 \oplus b_3 \oplus b_6))} \end{cases} \quad \text{Equation 1}$$

Using the pseudo-orthogonal code generator of Korean Patent No. 0761669, the spectral efficiency becomes 0.5625 (9/16) by converting a 9-bit size transmission information data into a pseudo-orthogonal code in accordance with Walsh-Hadamard code table as shown in Table 1. Thus, the spectral efficiency is enhanced by 225% in comparison to the conventional orthogonal code generator.

However, the pseudo-orthogonal code generator of Korean Patent No. 0761669 requires four multiplexers and three adders in addition to a 9-bit serial-to-parallel converter, a 512×16-bit ROM, and a 1-bit parallel-to-serial converter. Thus, the configuration is very complicated and the overall size becomes larger due to the much enlarged gate area when the pseudo-orthogonal code generator is fabricated as an application specific integrated circuit (ASIC). In addition to the above problem, there is a disadvantage of a slower operating speed because it uses a ROM.

SUMMARY

In one general aspect, provided is a pseudo-orthogonal code generator comprising a serial-to-parallel converter which converts a serial transmission data into a 9-bit parallel data, a 4-bit counter which repeatedly counts from 0 to 15, and a combined circuit unit which sequentially generates 16-bit pseudo-orthogonal codes using the 9-bit parallel data and the 4-bit counter values, wherein the combined circuit unit is comprised of $$cb0(I) = b_0 \oplus (i_1 \wedge b_1) \oplus (i_0 \wedge b_2)$$

$$cb1(I) = b_3 \oplus i_2 \oplus (i_1 \wedge b_4) \oplus (i_0 \wedge b_5)$$

$$cb2(I) = b_6 \oplus i_3 \oplus (i_1 \wedge b_7) \oplus (i_0 \wedge b_8)$$

$$cb3(I) = \overline{b_0 \oplus b_3 \oplus b_6} \oplus i_3 \oplus i_2 \oplus (i_1 \wedge (b_1 \oplus b_4 \oplus b_7)) \oplus (i_0 \wedge (b_2 \oplus b_5 \oplus b_8))$$

$$C(I) = (-1)^{\overline{cb0(I) \oplus cb1(I) \oplus cb2(I) \oplus cb3(I)}(cb0(I) \wedge cb1(I))(cb2(I) \wedge cb3(I))}, \quad 0 \leq I \leq 15$$

and, wherein C(I) is a pseudo-orthogonal code of the 9-bit parallel data for $0 \leq I \leq 15$, b0~b8 are said parallel data, and i0~i3 are the 4-bit counter values binarized from the I which corresponds to an index for 16-bit pseudo-orthogonal code.

The pseudo orthogonal code generator may further comprise a 2×1 multiplexer which converts a logic value outputted from the combined circuit unit into a real value.

In another aspect, provided is a pseudo-orthogonal code generator comprising a serial-to-parallel converter which converts a serial transmission data into a 9-bit parallel data, a 4-bit counter which repeatedly counts from 0 to 15, and a combined circuit unit which sequentially generates 16-bit pseudo-orthogonal codes using the 9-bit parallel data and the 4-bit counter values, wherein the combined circuit unit is comprised of $$cb0(I) = b_0 \oplus (i_1 \wedge b_1) \oplus (i_0 \wedge b_2)$$
$$cb1(I) = b_3 \oplus i_2 \oplus (i_1 \wedge b_4) \oplus (i_0 \wedge b_5)$$
$$cb2(I) = b_6 \oplus i_3 \oplus (i_1 \wedge b_7) \oplus (i_0 \wedge b_8)$$
$$cb3(I) = \overline{b_0 \oplus b_3 \oplus b_6} \oplus i_3 \oplus i_2 \oplus (i_1 \wedge (b_1 \oplus b_4 \oplus b_7)) \oplus (i_0 \wedge (b_2 \oplus b_5 \oplus b_8))$$
$$C(I) = (-1) \begin{cases} [\overline{cb0(I)}|cb1(I)|cb2(I)|cb3(I)] \wedge [cb0(I)|\overline{cb1(I)}|cb2(I)|cb3(I)] \wedge \\ [cb0(I)|cb1(I)|\overline{cb2(I)}|cb3(I)] \wedge [cb0(I)|cb1(I)|cb2(I)|\overline{cb3(I)}] \end{cases}, 0 \leq I \leq 15$$

and, wherein C(I) is a pseudo-orthogonal code of the 9-bit parallel data for 0≦I≦15, b0~b8 are the parallel data, and i0~i3 are 4-bit counter values binarized from the I which corresponds to an index for 16-bit pseudo-orthogonal code.

The pseudo orthogonal code generator may further comprise a 2×1 multiplexer which converts the values of the logic output from said combined circuit unit into a real value.

Other features and aspects will be apparent from the following detailed description, the drawings, and the claims.

Figure 1:
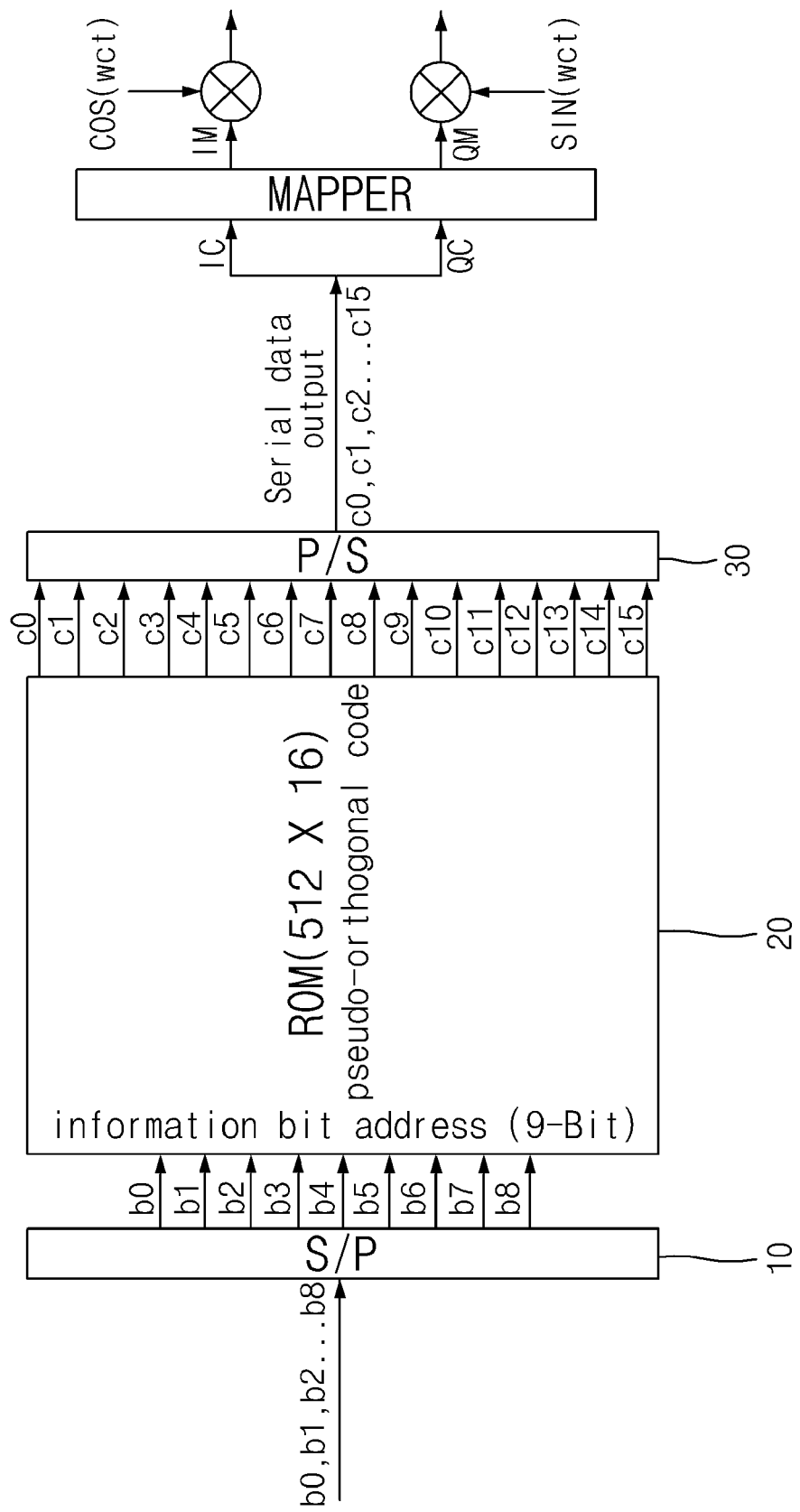
FIG. 1 is a diagram illustrating a conventional pseudo orthogonal code generator.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
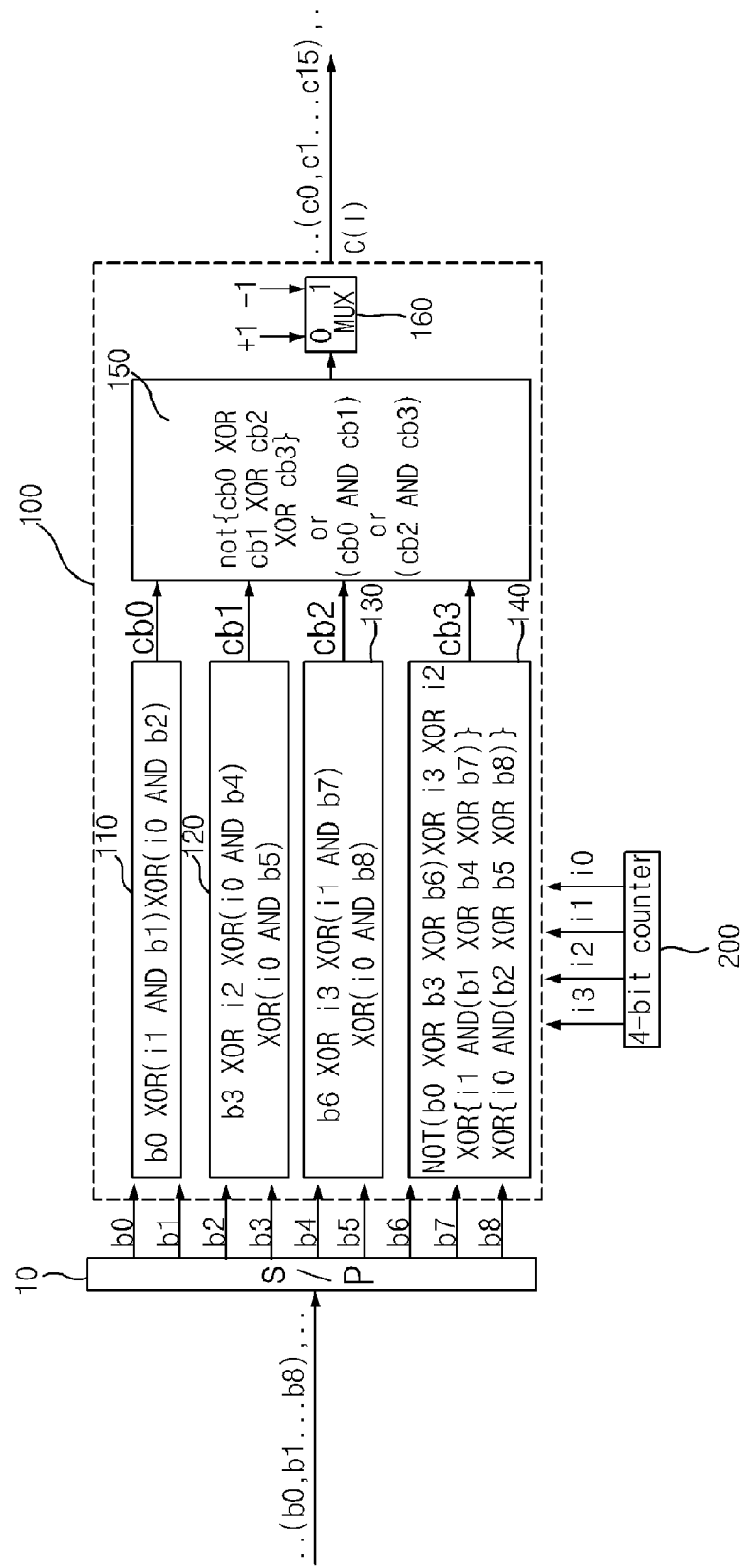
FIG. 2 is a diagram illustrating an example of a pseudo orthogonal code generator.

FIG. 2 illustrates an example of a pseudo-orthogonal code generator. Referring to FIG. 2, the example pseudo-orthogonal code includes a serial-to-parallel converter 10, a combined circuit unit 100, and a 4-bit counter 200.

The serial-to-parallel converter 10 converts transmitting data that is serially inputted in single bits into a 9-bit parallel data. The 4-bit counter 200 repeatedly counts from 0 to 15. The combined circuit unit 100 sequentially generates 16-bit pseudo-orthogonal codes using the 9-bit parallel data from the output of the serial-to-parallel converter 10 and count values (i0~i3) of the 4-bit counter 200. The internal configuration of the combined circuit unit 100 may be expressed by Equation 2.

Equation 2

$$cb0(I) = b_0 \oplus (i_1 \wedge b_1) \oplus (i_0 \wedge b_2)$$
$$cb1(I) = b_3 \oplus i_2 \oplus (i_1 \wedge b_4) \oplus (i_0 \wedge b_5)$$
$$cb2(I) = b_6 \oplus i_3 \oplus (i_1 \wedge b_7) \oplus (i_0 \wedge b_8)$$
$$cb3(I) = \overline{b_0 \oplus b_3 \oplus b_6} \oplus i_3 \oplus i_2 \oplus (i_1 \wedge (b_1 \oplus b_4 \oplus b_7)) \oplus (i_0 \wedge (b_2 \oplus b_5 \oplus b_8))$$
$$C(I) = (-1)^{(\overline{cb0(I)} \oplus cb1(I) \oplus cb2(I) \oplus cb3(I))(cb0(I) \wedge cb1(I))(cb2(I) \wedge cb3(I))}, 0 \leq I \leq 15$$

Referring to Equation 2, C(I) is a pseudo-orthogonal code of the 9-bit parallel data for 0≦I≦15, and b0~b8 are the parallel data. i0~i3 are the 4-bit counter values binarized from I that corresponds to an index for 16-bit pseudo-orthogonal code.

The example combined circuit unit 100 shown in FIG. 2 includes five combined circuits 110, 120, 130, 140, and 150. The first combined circuit 110 performs a logic operation as described in the first line of Equation 2 and outputs an interim result value (cb0). The second combined circuit 120 performs a logic operation as described in the second line of Equation 2 and outputs an interim result value (cb1).

The third combined circuit 130 performs a logic operation as described in the third line of Equation 2 and outputs an interim result value (cb2). The fourth combined circuit 140 performs a logic operation as described in the fourth line of Equation 2 and outputs an interim result value (cb3).

The fifth combined circuit 150 performs a logic operation as described in the fifth line of Equation 2 using the interim result values (cb0~cb3) of the first through fourth line which are the outputs of the first, second, third and fourth combined circuits (110~140), and sequentially outputs the final logic values to form a 16-bit pseudo orthogonal code for each bit.

In some embodiments, the pseudo-orthogonal code generator may comprise a 2×1 multiplexer. The 2×1 multiplexer 160 converts logic value $0_2$ or $1_2$, which is an output from the 5th combined circuit 150, into a real value of 1 or −1, for example, $1=(-1)^0$ and $-1=(-1)^1$. In some embodiments, the 2×1 multiplexer 160 may be implemented outside of the combined circuit unit 100.

Figure 3:
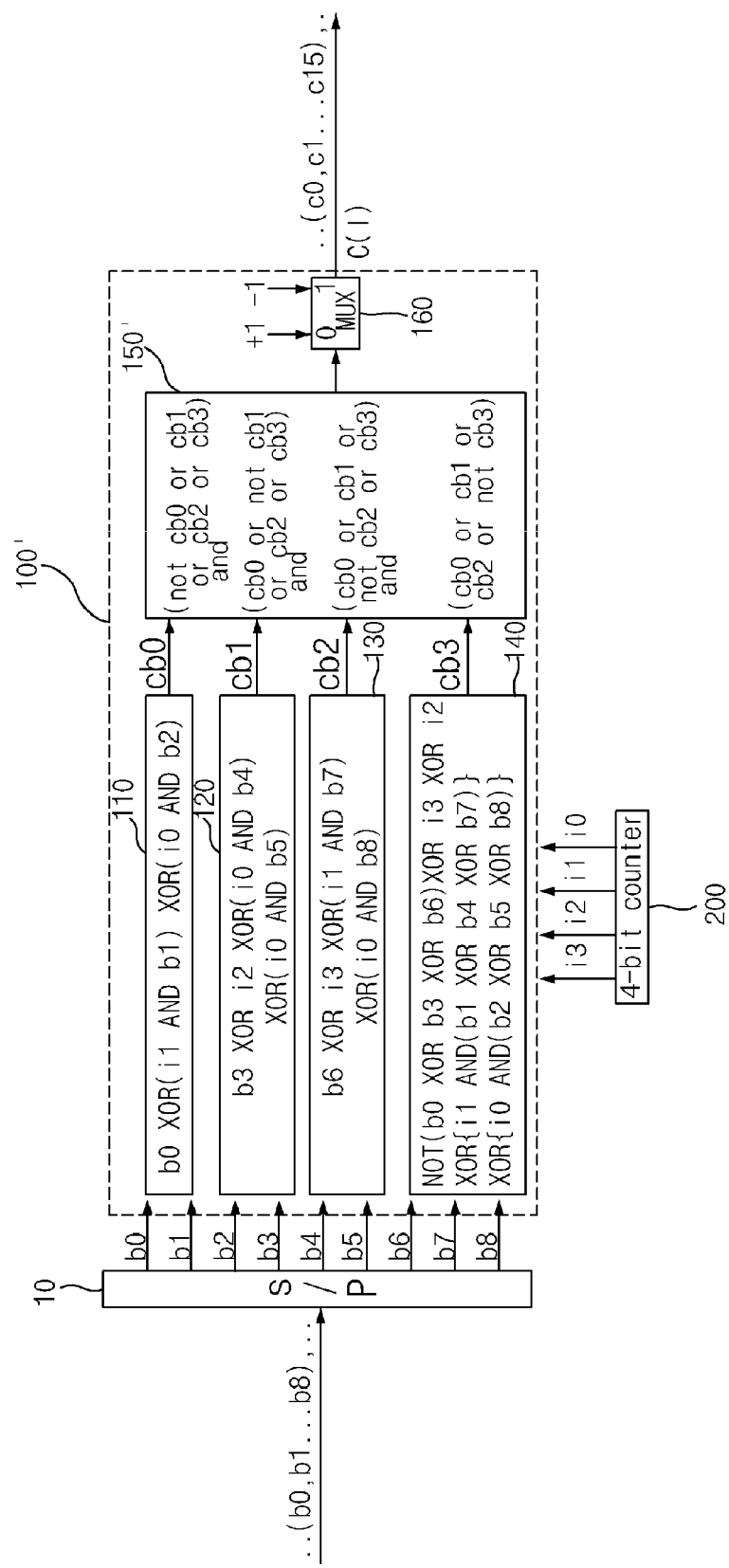
FIG. 3 is a diagram illustrating another example of a pseudo orthogonal code generator.

FIG. 3 is a diagram illustrating another example of a pseudo-orthogonal code generator. The pseudo-orthogonal code generator of FIG. 3 has the same configuration as the pseudo-orthogonal code generator of FIG. 2. Thus a description is omitted. In the pseudo-orthogonal code generator of FIG. 3 the fifth combined circuit 150' of the combined circuit unit 100' is configured differently than the fifth combined circuit 150 of the combined circuit unit 100 shown in FIG. 2. The internal configuration of the combined circuit unit 100 may be expressed by Equation 3.

Equation 3

$$cb0(I) = b_0 \oplus (i_1 \wedge b_1) \oplus (i_0 \wedge b_2)$$
$$cb1(I) = b_3 \oplus i_2 \oplus (i_1 \wedge b_4) \oplus (i_0 \wedge b_5)$$
$$cb2(I) = b_6 \oplus i_3 \oplus (i_1 \wedge b_7) \oplus (i_0 \wedge b_8)$$
$$cb3(I) = \overline{b_0 \oplus b_3 \oplus b_6} \oplus i_3 \oplus i_2 \oplus (i_1 \wedge (b_1 \oplus b_4 \oplus b_7)) \oplus (i_0 \wedge (b_2 \oplus b_5 \oplus b_8))$$
$$C(I) = (-1) \begin{cases} [\overline{cb0(I)}|cb1(I)|cb2(I)|cb3(I)] \wedge [cb0(I)|\overline{cb1(I)}|cb2(I)|cb3(I)] \wedge \\ [cb0(I)|cb1(I)|\overline{cb2(I)}|cb3(I)] \wedge [cb0(I)|cb1(I)|cb2(I)|\overline{cb3(I)}] \end{cases}, 0 \leq I \leq 15$$

As described above, a pseudo orthogonal code may be generated easily and quickly through logic operations of the 9-bit transmission data and 4-bit counter value using the combined circuit units 100, 100'.

Figure 4:
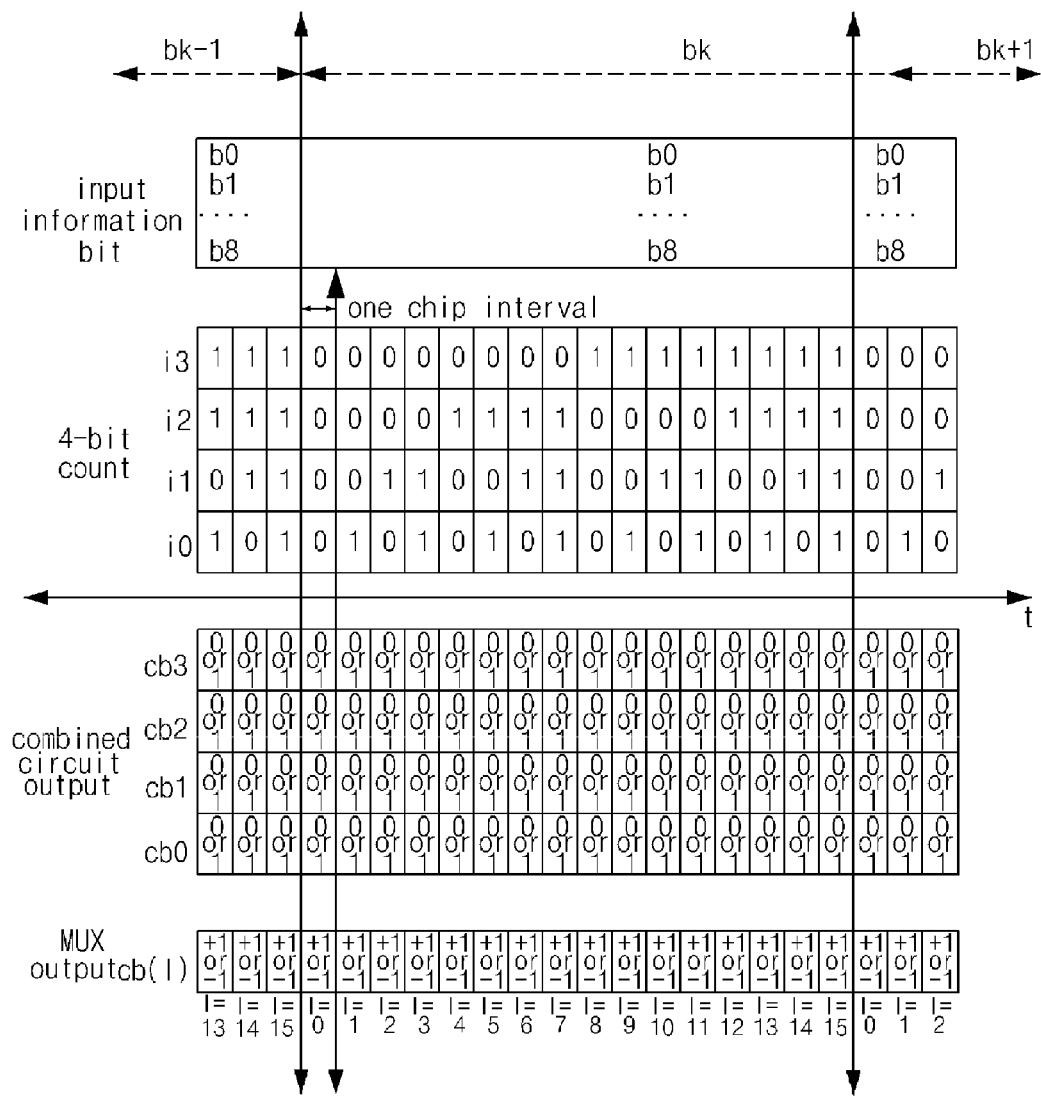
FIG. 4 is an example of a timing diagram of the pseudo orthogonal code generators in FIG. 2 and FIG. 3.

FIG. 4 is an example of a timing diagram of a pseudo orthogonal code generator in FIG. 2 and FIG. 3. Referring to FIGS. 2-4, a serially inputted transmission data is converted into a parallel data and divided by bit interval (9-bit) using a serial-to-parallel converter 10, and a 4-bit counter 200 that repeatedly counts from 0 to 15 in sequential manner in this bit interval.

As a result, the transmission input data values (b0~b8) and 4-bit counter values (i0~i3) are fixed in one chip area. The result values of the combined circuit units 100 and 100' that perform logic operations using these values, are also fixed. And if the logic operations are repeatedly performed every one chip period, a 16-bit pseudo orthogonal code for each serially inputted 9-bit transmission (information) data may be serially outputted.

The resulting pseudo-orthogonal code may be modulated using a Quadrature phase-shift keying (QPSK). For example, if the serially outputted pseudo-orthogonal codes are symbolized by 2-bit parallel processing, a QPSK modulation can be performed, if the pseudo-orthogonal codes are symbolized by 3-bit parallel processing, an 8PSK modulation is possible, if the pseudo-orthogonal codes are symbolized by 4-bit parallel processing, a 16QAM modulation is possible, if the pseudo-orthogonal codes are symbolized by 5-bit parallel processing, a 32QAM modulation is possible, and if the pseudo-orthogonal codes are symbolized by 6-bit parallel processing, a 64QAM modulation is possible A pseudo orthogonal code generator of this invention is not limited to the above described exemplary embodiments, and could be implemented through various modifications within the scope where the technical spirit of this invention permits.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pseudo orthogonal code generator comprising:
   a serial-to-parallel converter which converts a serial transmission data into a 9-bit parallel data;
   a 4-bit counter which repeatedly counts from 0 to 15; and
   a combined circuit unit which sequentially generates 16-bit pseudo orthogonal codes using the 9-bit parallel data and the 4-bit counter values, wherein the combined circuit unit is comprised of $$cb0(I) = b_0 \oplus (i_1 \wedge b_1) \oplus (i_0 \wedge b_2)$$
$$cb1(I) = b_3 \oplus i_2 \oplus (i_1 \wedge b_4) \oplus (i_0 \wedge b_5)$$
$$cb2(I) = b_6 \oplus i_3 \oplus (i_1 \wedge b_7) \oplus (i_0 \wedge b_8)$$
$$cb3(I) = \overline{b_0 \oplus b_3 \oplus b_6} \oplus i_3 \oplus i_2 \oplus (i_1 \wedge (b_1 \oplus b_4 \oplus b_7)) \oplus (i_0 \wedge (b_2 \oplus b_5 \oplus b_8))$$
$$C(I) = (-1)^{(cb0(I) \oplus cb1(I) \oplus cb2(I) \oplus cb3(I))(cb0(I) \wedge cb1(I))(cb2(I) \wedge cb3(I))}, 0 \leq I \leq 15$$

and, wherein C(I) is a pseudo-orthogonal code of the 9-bit parallel data for $0 \leq I \leq 15$, b0~b8 are the parallel data, and i0~i3 are the 4-bit counter values binarized from the I which corresponds to an index for 16-bit pseudo-orthogonal code.

2. The pseudo orthogonal code generator of claim 1, further comprising a 2×1 multiplexer which converts a logic value outputted from the combined circuit unit into a real value.

3. A pseudo orthogonal code generator comprising:
   a serial-to-parallel converter which converts a serial transmission data into a 9-bit parallel data;
   a 4-bit counter which repeatedly counts from 0 to 15; and
   a combined circuit unit which sequentially generates 16-bit pseudo orthogonal codes using the 9-bit parallel data and the 4-bit counter values, wherein the combined circuit unit is comprised of $$cb0(I) = b_0 \oplus (i_1 \wedge b_1) \oplus (i_0 \wedge b_2)$$
$$cb1(I) = b_3 \oplus i_2 \oplus (i_1 \wedge b_4) \oplus (i_0 \wedge b_5)$$
$$cb2(I) = b_6 \oplus i_3 \oplus (i_1 \wedge b_7) \oplus (i_0 \wedge b_8)$$
$$cb3(I) = \overline{b_0 \oplus b_3 \oplus b_6} \oplus i_3 \oplus i_2 \oplus (i_1 \wedge (b_1 \oplus b_4 \oplus b_7)) \oplus (i_0 \wedge (b_2 \oplus b_5 \oplus b_8))$$
$$C(I) = (-1)^{\left\{\begin{array}{l}[\overline{cb0(I)}|cb1(I)|cb2(I)|cb3(I)] \wedge [cb0(I)|\overline{cb1(I)}|cb2(I)|cb3(I)] \wedge \\ [cb0(I)|cb1(I)|\overline{cb2(I)}|cb3(I)] \wedge [cb0(I)|cb1(I)|cb2(I)|\overline{cb3(I)}]\end{array}\right\}}, 0 \leq I \leq 15$$

and, wherein C(I) is a pseudo-orthogonal code of the 9-bit parallel data for $0 \leq I \leq 15$, b0~b8 are the parallel data, and i0~i3 are the 4-bit counter values binarized from the I which corresponds to an index for 16-bit pseudo-orthogonal code.

4. The pseudo orthogonal code generator of claim 3, further comprising a 2×1 multiplexer which converts a logic value outputted from the combined circuit unit into a real value.

* * * * *